UNITED STATES PATENT OFFICE.

ISAAC MARSH, JR., OF MILTON, AND GRIGGS MARSH, OF LEWISBURG, PA.

IMPROVED COMPOSITION FOR FORMING CEMENT TILES, PIPES, PAVEMENTS, BUILDING-BLOCKS, &c.

Specification forming part of Letters Patent No. 38,833, dated June 9, 1863.

*To all whom it may concern:*

Be it known that we, ISAAC MARSH, Jr., of Milton, Northumberland county, and State of Pennsylvania, and GRIGGS MARSH, of Lewisburg, county of Union, and State aforesaid, have invented a new and improved cement for joining together tile-plates, tile-pipes, and any other useful thing or matter for which said cement can or may be used for hereafter; and we do hereby declare that the following is a full and correct description thereof, reference being had to the composition or parts thereof placed in the United States Patent Office at Washington.

The nature of our invention consists in making a fire and water proof cement for all purposes which said cement can or may be used for, and for connecting together tile-plates and tile-pipes, and for which we claim that said cement possesses flexibility, tension, great strength, and fire and water proof qualities.

To enable others skilled in the art to make and use our invention, we will proceed to describe the manufacture of said cement, which is made in the following manner:

We use coal-tar with potter's fine clays, free as possible from sand, made as follows, to wit: Take said clays and make them perfectly dry, after which the clay must be reduced to a fine palpable powder, which must then be placed in some vessel with said coal-tar, and by the action of heat or distillation boiled down to the proper consistency for which it may be used for thereafter. If a hard cement is wanted, it will need to be reduced by distillation to a less quantity than if a soft or more pliable cement is wanted.

The proportions used of coal-tar and potter's clay-dust is about thirty-three per cent. of coal-tar with sixty-six per cent. of potter's clay, but which said per cent. may be varied according to circumstances, which will readily suggest to the manufacturer for the different purposes to which said cement would be used for.

This cement can be used to great advantage in cementing cisterns, underground tile, or other pipes, and for any place where a strong tenacious fire and water proof cement may be needed.

With the aforesaid cement we form a new and improved building or paving brick or block, and which we think is valuable for the following reasons, as in the manner in which they are made they can be made of any required size or shape, from the smallest brick to the largest paving-block, and which is so strong that they cannot be broken with the same ease that brick or stone can, and to show the strength of the above cement, in combination with the gravel as used in said bricks or blocks, a block may be broken, which requires great force, and the small pebbles will break with it without becoming loosened from the cement. Blocks used in pavements of this kind have great advantages over the common coal-tar pavements, as it is entirely void of smell; and said blocks can be cemented together at the joints with the cement mentioned in the first specification; and as said cement is made by distillation, which evaporates the oil and water matter in the coal-tar, hence the absence of the smell.

Our manner of making said building or paving blocks or bricks is as follows: We use a mold made of rough or other boards of any required size or shape, into which said mold we lay gravel or other stone sufficient in quantity to fill said mold one-third or half full, as may be needed, to make a strong block, after which we take said cement or composition while it is yet hot and pour the same on the said gravel and mix all together until the cement and gravel are well mixed, when it is left to harden, which soon occurs, when the same mold is used again in like manner; or, if preferred, the stone or gravel may be boiled with the composition and all poured together in said mold and left to harden. We also use this composition with gravel for paving or other purposes by pouring or spreading the cement and gravel prepared as above stated over the whole surface of the pavement or place intended to be covered with it, which soon forms itself in one solid concrete mass. With this advantage over other coal-tar pavements, as it hardens immediately and is of immense strength, the cement or composition, before being mixed with gravel or stone, is prepared the same as described in our first part of this specification.

The cement for said blocks is made the same as described in the first specification, and to make said blocks any required size of molds is used, the gravel being applied while the cement is hot in said molds. Any sized stone we claim to use with said cement in forming the afore-mentioned blocks.

We claim—

1. An improved cement, as specified, in the manner and for the purposes herein fully set forth.

2. An improved paving or building block, in combination with our improved cement, made in the manner and for the purposes herein fully set forth.

3. The manner of preparing the said composition or cement in the proportions and of the materials used, as particularly set forth in the specification.

ISAAC MARSH, JR.
GRIGGS MARSH.

Witnesses:
J. A. MERTZ,
HIRAM REITMYER.